(12) United States Patent
Chou et al.

(10) Patent No.: US 11,300,274 B2
(45) Date of Patent: Apr. 12, 2022

(54) ANTI-LOOSING STRUCTURE AND BACKLIGHT MODULE

(71) Applicants: Futaijing Precision Electronics (Yantai) Co., Ltd., Yantai (CN); FIH (HONG KONG) LIMITED, Kowloon (HK)

(72) Inventors: Hun-Yi Chou, New Taipei (TW); Chih-Cheng Lee, New Taipei (TW)

(73) Assignees: Futaijing Precision Electronics (Yantai) Co., Ltd., Yantai (CN); FIH (HONG KONG) LIMITED, Kowloon (HK)

(*) Notice: Subject to any disclaimer, the term of this patent is extended or adjusted under 35 U.S.C. 154(b) by 0 days.

(21) Appl. No.: 17/358,721

(22) Filed: Jun. 25, 2021

(65) Prior Publication Data

US 2022/0010948 A1    Jan. 13, 2022

(30) Foreign Application Priority Data

Jul. 13, 2020  (CN) .......................... 202010668382.0

(51) Int. Cl.
*F21V 19/00*  (2006.01)
*G02F 1/1333*  (2006.01)

(52) U.S. Cl.
CPC ........ *F21V 19/0045* (2013.01); *F21V 19/002* (2013.01); *F21V 19/005* (2013.01); *G02F 1/133317* (2021.01)

(58) Field of Classification Search
CPC ........ G02F 1/133317; G02F 1/133308–13332; F21V 19/004; F21V 19/0045
See application file for complete search history.

(56) References Cited

U.S. PATENT DOCUMENTS 6,340,264 B1 * 1/2002 Nelson .................. E04F 19/062
403/297

FOREIGN PATENT DOCUMENTS

CN         1268612 A     10/2000

* cited by examiner

*Primary Examiner* — Sean P Gramling
(74) *Attorney, Agent, or Firm* — ScienBiziP, P.C.

(57) ABSTRACT

An anti-loosing structure includes a first buckle element and a second buckle element. The first buckle element has a first substrate and a clamping portion disposed on the first substrate. The second buckle element has a second substrate, an embedding portion disposed on the second substrate, and an anti-loosing block. The embedding portion is made of an elastic material, the anti-loosing block is movably disposed in the embedding portion, and is configured to cause the embedding portion to be elastically expanded. The embedding portion is configured to be inserted into the clamping portion, causing the embedding portion to connect to the clamping portion by interference fitting.

10 Claims, 9 Drawing Sheets

ANTI-LOOSING STRUCTURE AND BACKLIGHT MODULE

FIELD

The subject matter herein generally relates to an anti-loosing structure and a backlight module.

BACKGROUND

Two components can be connected together by screw bolts, hot-melting, or ultrasonic welding. Although this type of connection method is somewhat useful, a new connection method may be still needed.

BRIEF DESCRIPTION OF THE DRAWINGS

Implementations of the present technology will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIGS. 1 to 4 illustrate an embodiment of an anti-loosing structure 100, which includes a first buckle element 10 and a second buckle element 20. The first buckle element 10 includes a first substrate 1 and a clamping portion 2 disposed on the first substrate 1. The second buckle element 20 includes a second substrate 3, an embedding portion 4 disposed on the second substrate, and an anti-loosing block 5.

The embedding portion 4 is made of an elastic material such as rubber. The anti-loosing block 5 is movably disposed in the embedding portion 4, and can cause the embedding portion 4 to be elastically expanded. Then, when the expanded embedding portion 4 is inserted into the clamping portion 2, the embedding portion 4 and the clamping portion 2 can be connected to each other by interference fitting.

Figure 1:
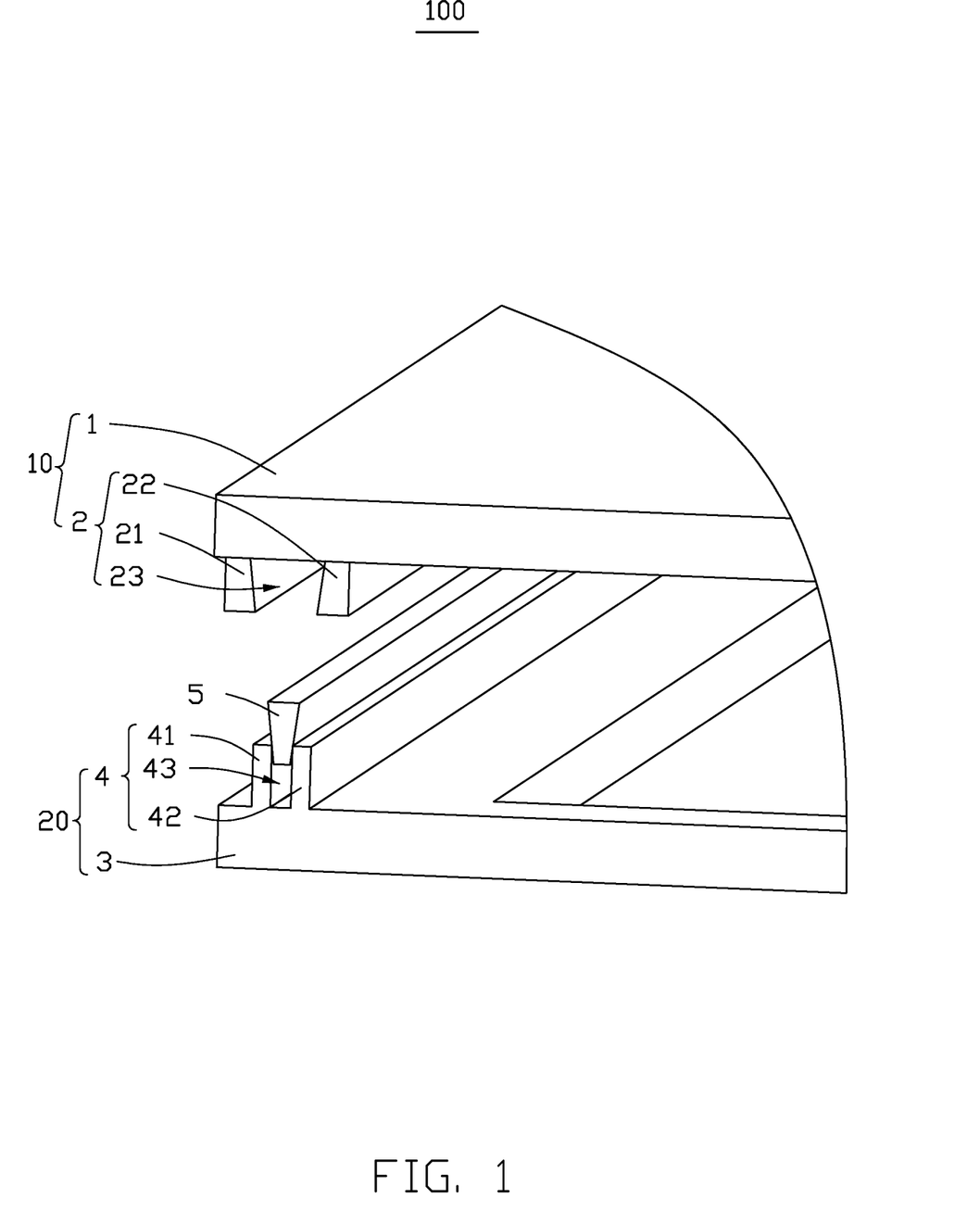
FIG. 1 is an exploded view of an embodiment of an anti-loosing structure according to the present disclosure.
Figure 2:
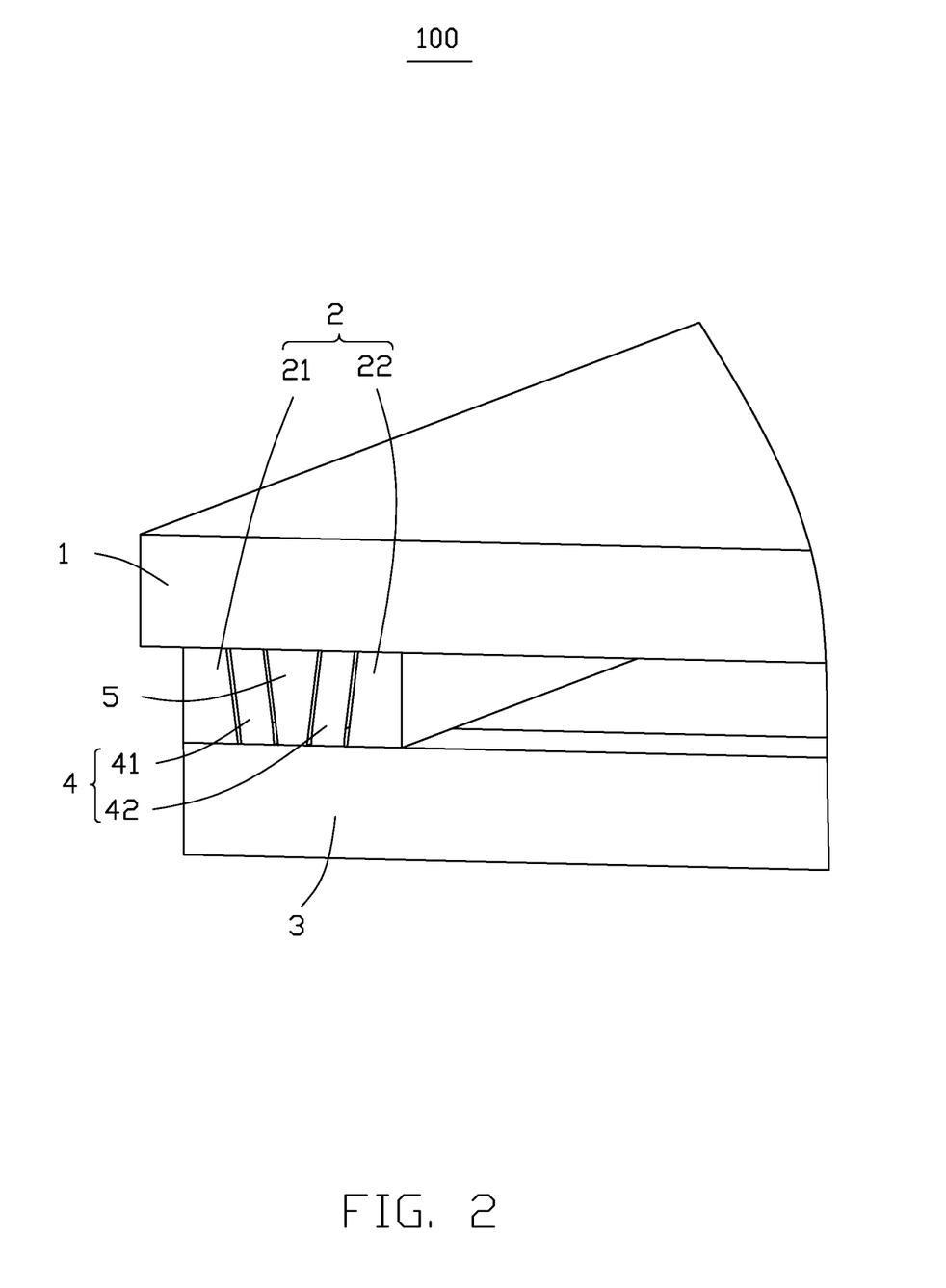
FIG. 2 is a diagrammatic view of the anti-loosing structure shown in FIG. 1, in an assembled state.
Figure 3:
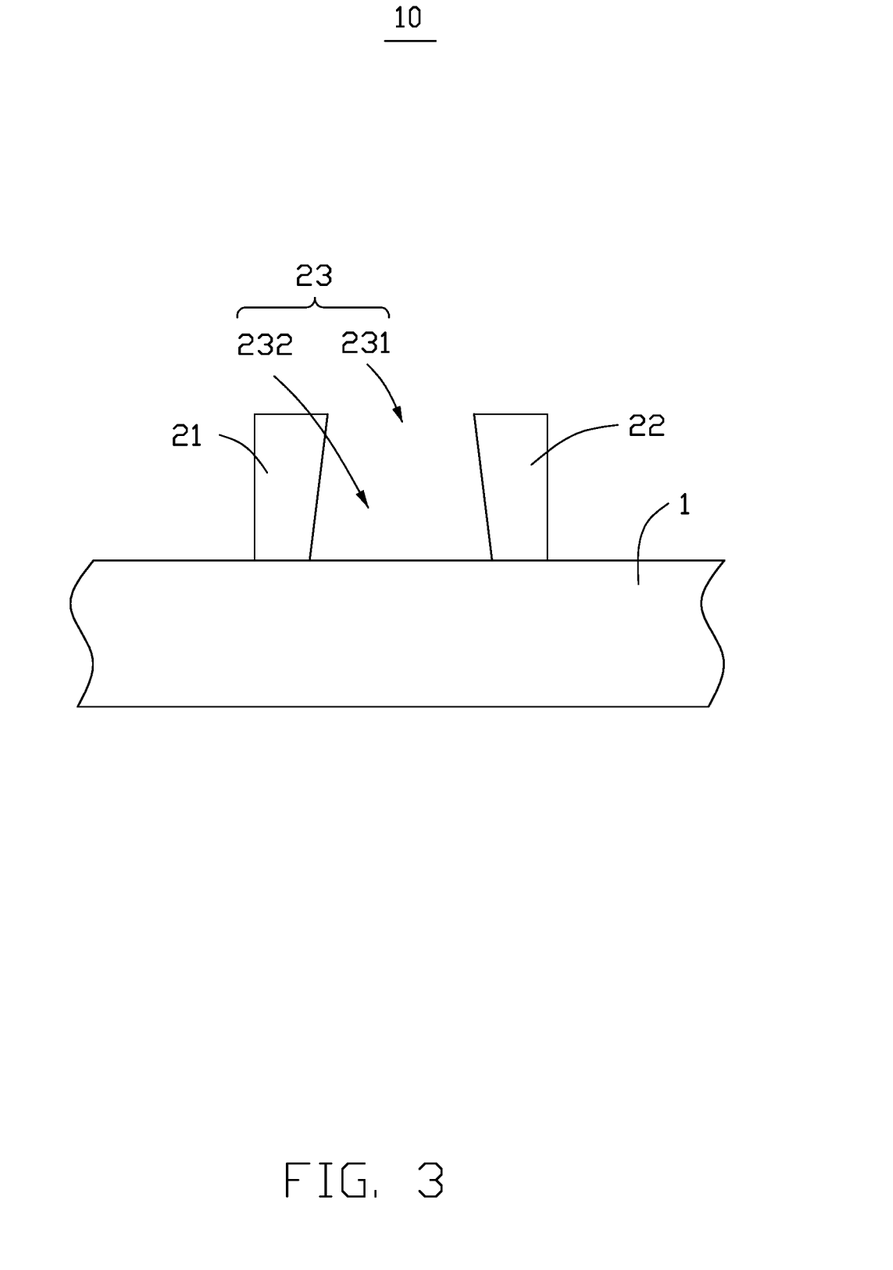
FIG. 3 is a diagrammatic view of a first buckle element of the anti-loosing structure of FIG. 1.

Referring to FIGS. 1 to 3, the clamping portion 2 includes a first sidewall 21 and a second sidewall 22 each disposed on the first substrate 1. The first sidewall 21 and the second sidewall 22 are spaced from each other and cooperative define a first slot 23. The first slot 23 includes a first end 231 away from the first substrate 1 and a second end 232 close to the first substrate 1. A width of the first end 231 is smaller than a width of the second end 232. The width is defined as a size of the first slot 23 along any direction parallel to the plane where the first substrate 1 is located. That is, the first slot 23 is substantially wedge-shaped.

In at least one embodiment, the clamping portion 2 and the first substrate 1 are integrally formed.

As shown in FIGS. 1 and 2, the anti-loosing block 5 is also substantially wedge-shaped. The embedding portion 4 includes a third sidewall 41 and a fourth sidewall 42 each disposed on the second substrate 3. The third sidewall 41 and the fourth sidewall 42 are spaced apart from each other and cooperatively define a second slot 43. The second slot 43 is substantially rectangular. A width of the anti-loosing block 5 is greater than a width of the second slot 43. The width is defined as a size of the anti-loosing block 5 or the second slot 43 along any direction parallel to the plane where the second substrate 3 is located.

In at least one embodiment, the embedding portion 4 and the second substrate 3 may be integrally formed.

In at least one embodiment, the anti-loosing block 5 is made of a plastic or metal material.

After the anti-loosing block 5 is inserted into the embedding portion 4, since the embedding portion 4 is made of an elastic material, the third sidewall 41 and the fourth sidewall 42 are stretched away from each other, causing the embedding portion 4 to fix in the first slot 23. Therefore, the first buckle element 10 is fixed to the second buckle element 20. No other connection means, such as screw bolts, hot melting, or laser welding, are needed for further connecting the first buckle element 10 to the second buckle element 20. Thus, the connection of the first buckle element 10 and the second buckle element 20 is quick, simple, and convenient to operate.

Figure 4:
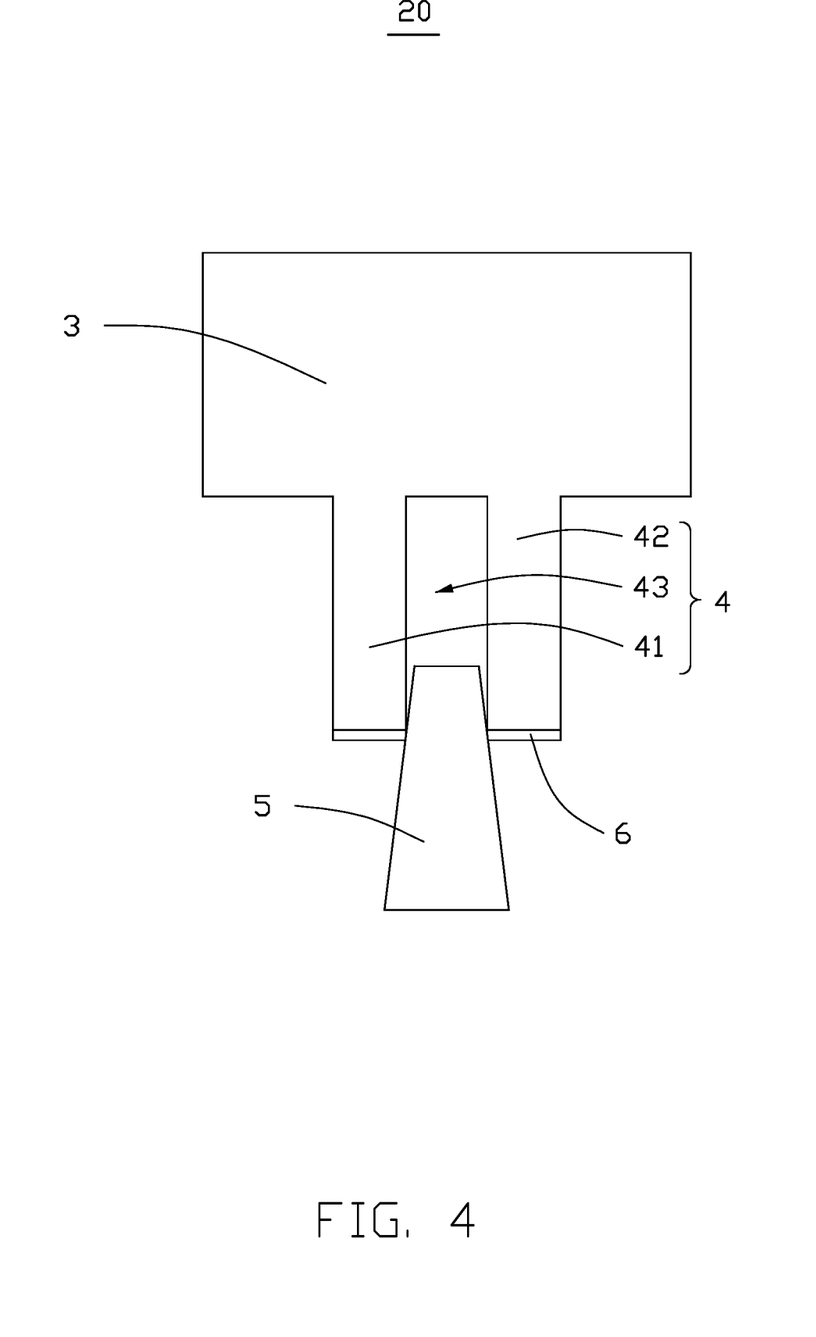
FIG. 4 is a diagrammatic view of a second buckle element of the anti-loosing structure of FIG. 1.

Referring to FIG. 4, an adhesive layer 6 may be disposed on an end of the embedding portion 4 away from the second substrate 3. After the clamping portion 2 and the embedding portion 4 are engaged with each other, the adhesive layer 6 can further bond the embedding portion 4 to the clamping portion 2, thereby improving the connection strength between the to the embedding portion 4 and the clamping portion 2. In other embodiments, the adhesive layer 6 may also be disposed on an end of the clamping portion 2 away from the first substrate 1.

Figure 5:
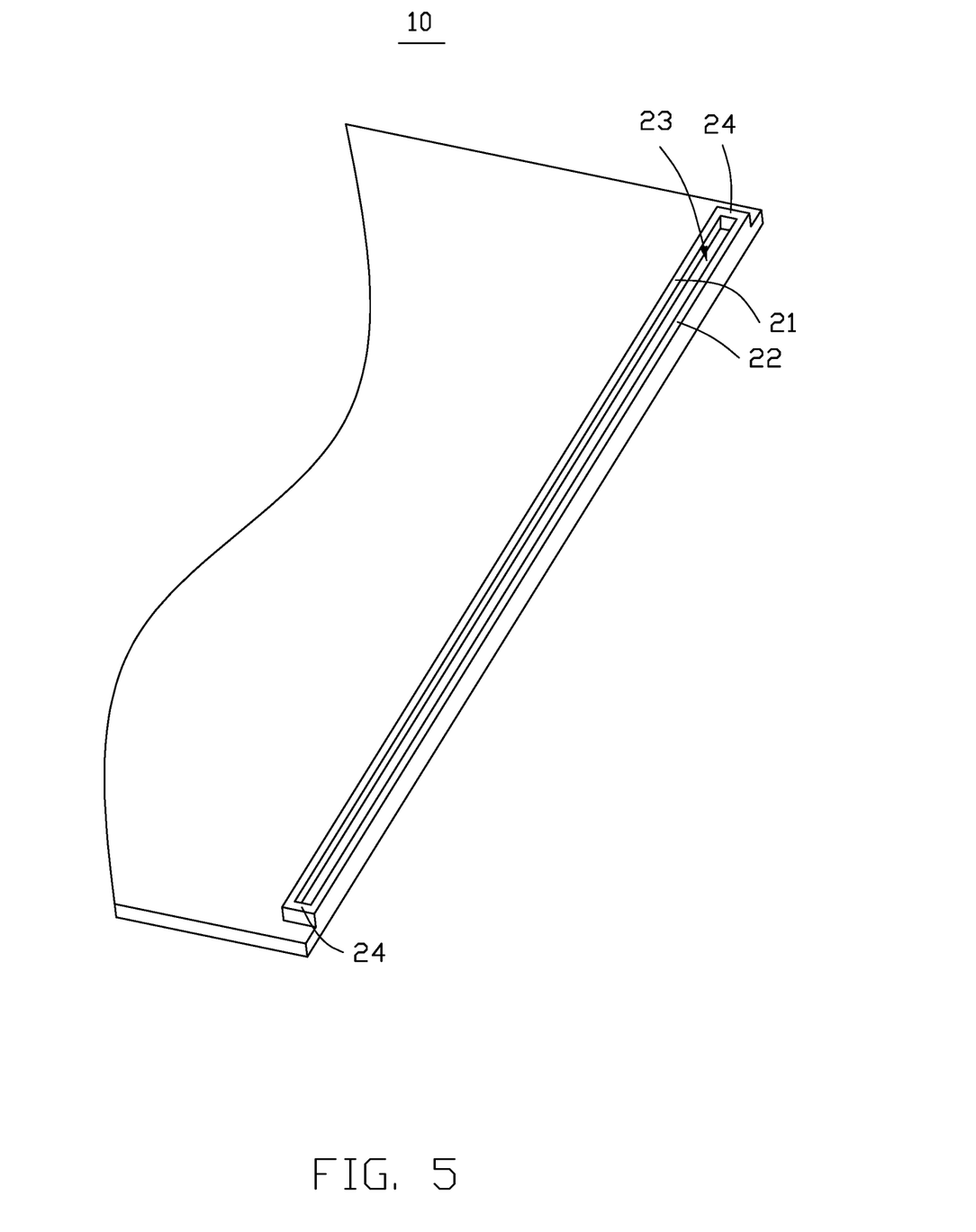
FIG. 5 is a diagrammatic view of another embodiment of a first buckle element of the anti-loosing structure of FIG. 1.

Referring to FIG. 5, in another embodiment, the buckle element 10 further includes at least one first end wall 24 connecting the sidewall 21 to the second sidewall 22. In at least one embodiment, two first end walls 24 are included, which are disposed at opposite ends of the first sidewall 21 and opposite ends of the second sidewall 22. The first sidewall 21, the second sidewall 22, and the first end wall 24 can cooperatively limit the anti-loosing block 5 and the embedding portion 4 in the first slot 23, thereby preventing the anti-loosing block 5 and the embedding portion 4 from disengage from the first slot 23.

Figure 6:
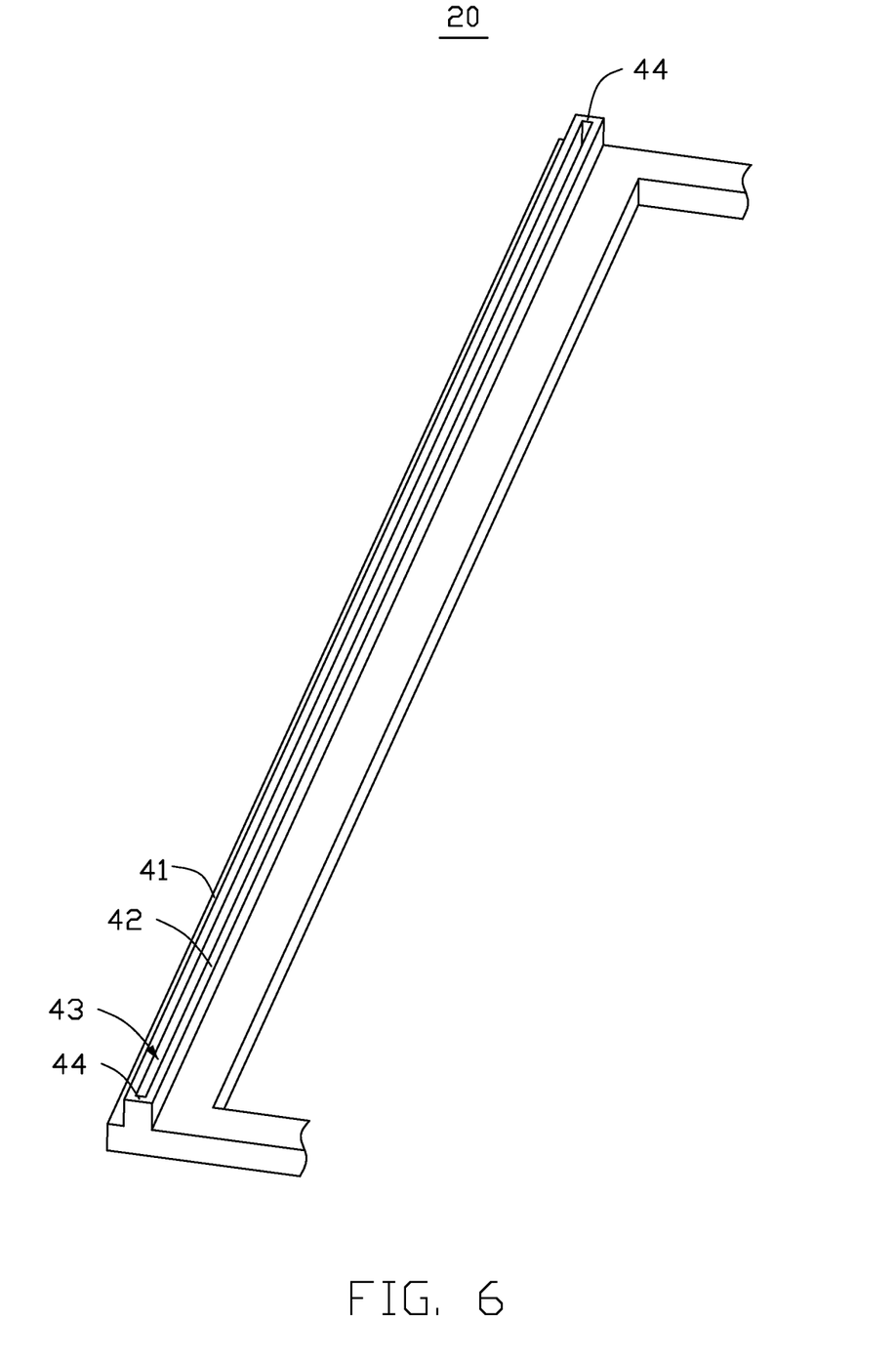
FIG. 6 is a diagrammatic view of another embodiment of a second buckle element of the anti-loosing structure of FIG. 1.

Referring to FIG. 6, in another embodiment, the second buckle element 20 further includes at least one second end wall 44 connecting the third sidewall 41 to the fourth sidewall 42. In at least one embodiment, two second end walls 44 are included, which are disposed at opposite ends of the third sidewall 41 and opposite ends of the first sidewall. The third sidewall 41, the fourth sidewall 42, and the second end wall 44 can cooperatively limit the anti-loosing block 5 in the second slot 43, thereby preventing the anti-loosing block 5 from disengage from the second slot 43.

A method for assembling the first buckle element 10 and the second buckle element 20 to obtain the anti-loosing structure 100 is also presented in accordance with an embodiment. The method is provided by way of example, as there are a variety of ways to carry out the method. The method can begin at step 1.

At step 1, a top portion of the anti-loosing block 5 is inserted into an opening of the second slot 43 of the embedding portion 4.

At step 2, the embedding portion 4 containing the anti-loosing block 5 is inserted into the first slot 23 of the clamping portion 2, causing a bottom portion of the anti-loosing block 5 to contact the first substrate 1.

At step 3, the second substrate 3 is pushed towards the first substrate 1, causing the third sidewall 41 and the fourth sidewall 42 to be stretched and to contact the first substrate 1. Then, the embedding portion 4 is fixed in the first slot 23.

Figure 7:
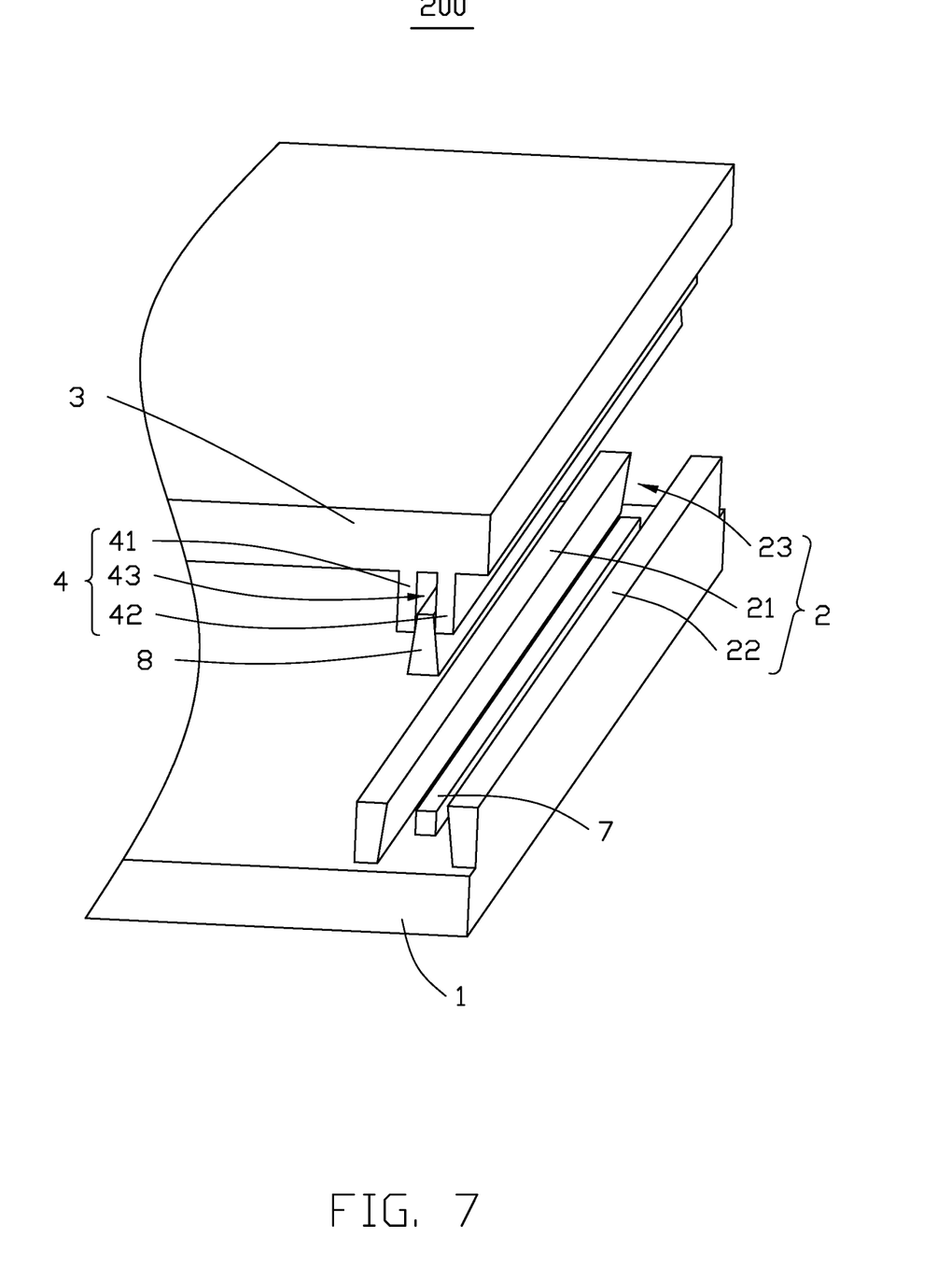
FIG. 7 is a diagrammatic view of another embodiment of an anti-loosing structure according to the present disclosure.
Figure 8:
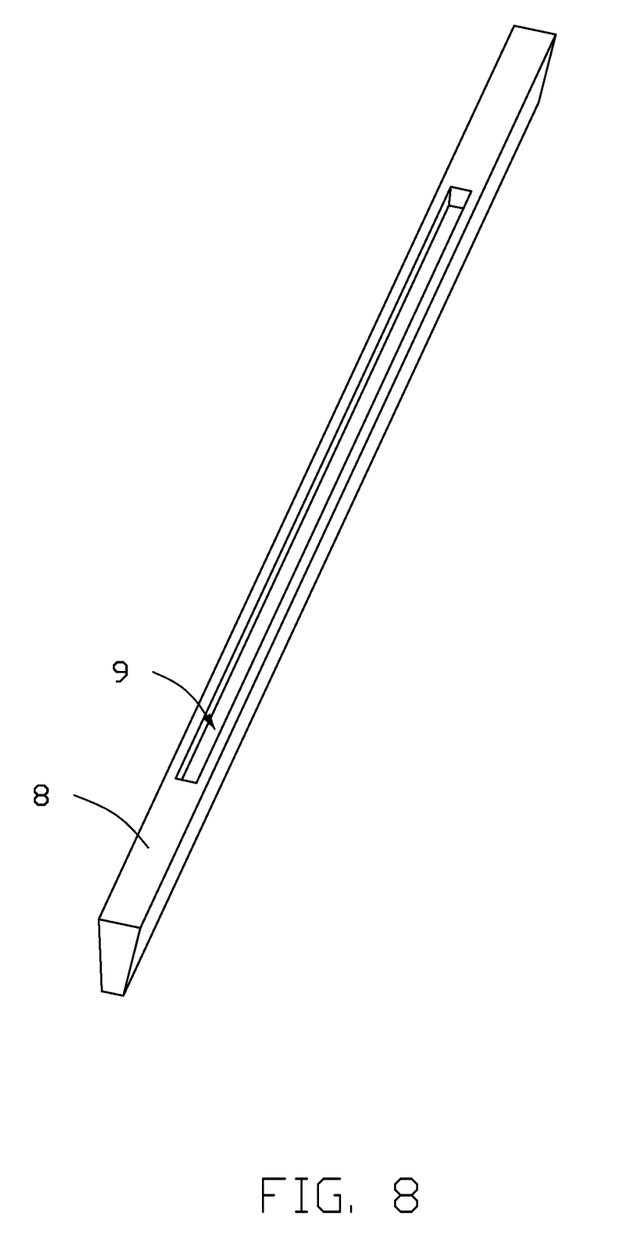
FIG. 8 is a diagrammatic view of yet another embodiment of an anti-loosing structure according to the present disclosure.

Referring to FIGS. 7 and 8, a second embodiment of an anti-loosing structure 200 is also provided. Different from the anti-loosing structure 100, the first buckle element 10 further includes a protruding block 7 disposed on the first substrate 1 and between the first sidewall 21 and the second sidewall 22. The anti-loosing block 8 further defines a groove 8 on a surface away from the first substrate 1. The protruding block 7 can be received in the groove 9, thereby positioning the anti-loosing block 8 on the first substrate 1. At the same time, the stability of the anti-loosing block 8 is enhanced.

Figure 9:
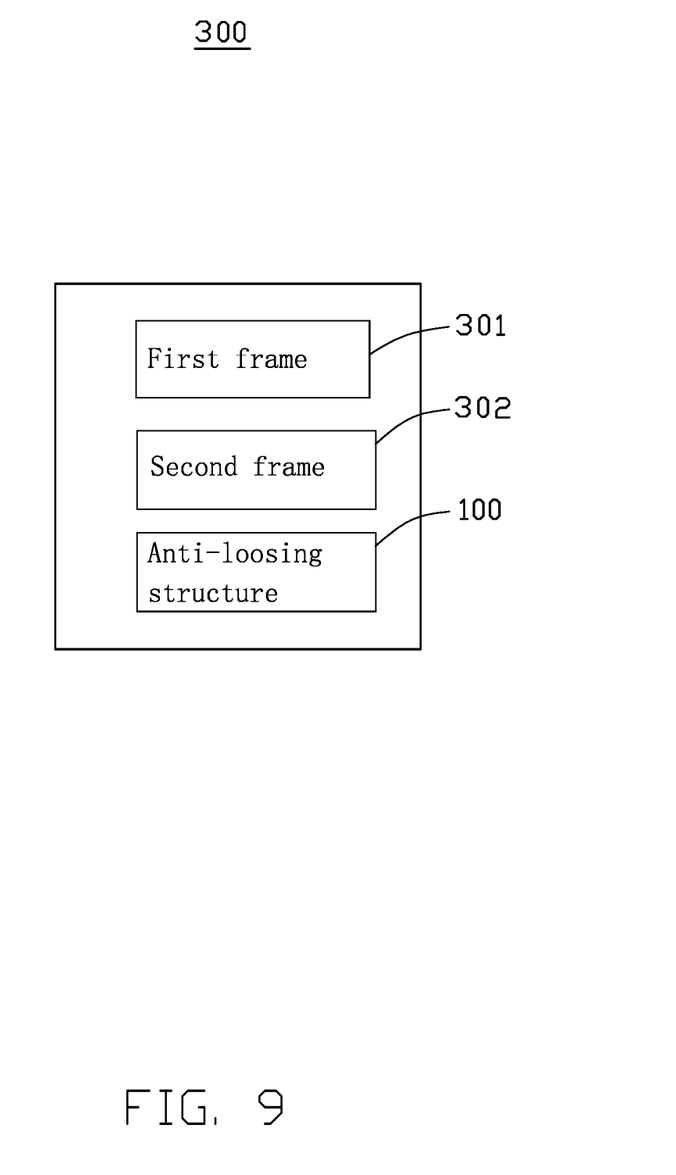
FIG. 9 is a block diagram of an embodiment of a blacklight module according to the present disclosure.

FIG. 9 illustrates an embodiment of a blacklight module 300. The blacklight module 300 includes a first frame 301, a second frame 302, and the anti-loosing structure 100 or 200. The first frame 301 and the second frame 302 are respectively mounted to the first substrate 1 and the second substrate 3. Thus, the first frame 301 and the second frame 302 can be fixed to each other.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A backlight module, comprising:
a first frame;
a second frame; and
an anti-loosing structure, comprising:
a first buckle element mounted to the first frame, and comprising a first substrate and a clamping portion disposed on the first substrate; and
a second buckle element mounted to the second frame, and comprising a second substrate, an embedding portion disposed on the second substrate, and an anti-loosing block;
wherein the embedding portion is made of an elastic material, the anti-loosing block is movably disposed in the embedding portion, and is configured to cause the embedding portion to be elastically expanded, wherein the embedding portion is configured to be inserted into the clamping portion, causing the embedding portion to connect to the clamping portion by interference fitting.

2. The backlight module of claim 1, wherein the clamping portion comprises a first sidewall and a second sidewall each disposed on the first substrate, the first sidewall and the second sidewall are spaced from each other and cooperatively define a first slot, the first slot comprises a first end and a second end, the second end is closer to the first substrate than the first end to the first substrate, and a width of the first end is smaller than a width of the second end.

3. The backlight module of claim 2, wherein the clamping portion further comprises at least one first end wall connecting the first sidewall to the second sidewall.

4. The backlight module of claim 2, wherein the first buckle element further comprises a protruding block disposed on the first substrate and between the first sidewall and the second sidewall, the anti-loosing block defines a groove, and the protruding block is configured to be received in the groove.

5. The backlight module of claim 2, wherein the embedding portion comprises a third sidewall and a fourth sidewall each disposed on the second substrate, the third sidewall and the fourth sidewall are spaced from each other and cooperatively define a second slot, the anti-loosing block is configured to increase a distance between the third sidewall and the fourth sidewall when the anti-loosing block is inserted into the second slot.

6. The backlight module of claim 5, wherein the embedding portion further comprises at least one second end wall connecting the third sidewall to the fourth sidewall.

7. The backlight module of claim 1, wherein the anti-loosing structure further comprises an adhesive layer disposed on an end of the clamping portion away from the first substrate.

8. The backlight module of claim 1, wherein the anti-loosing structure further comprises an adhesive layer disposed on an end of the embedding portion away from the second substrate.

9. The backlight module of claim 1, wherein the clamping portion and the first substrate are integrally formed.

10. The backlight module of claim 1, wherein the embedding portion and the second substrate are integrally formed.

* * * * *